United States Patent
Maeda

(10) Patent No.: US 6,495,616 B2
(45) Date of Patent: Dec. 17, 2002

(54) LIQUID CRYSTAL POLYESTER RESIN COMPOSITION AND MOLDED PRODUCT THEREOF

(75) Inventor: Mituo Maeda, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/735,493

(22) Filed: Dec. 14, 2000

(65) Prior Publication Data

US 2001/0012862 A1 Aug. 9, 2001

(30) Foreign Application Priority Data

Dec. 16, 1999 (JP) .............................. 11-357341

(51) Int. Cl.⁷ ............................ C08K 3/40; C08L 67/02; C08J 9/32
(52) U.S. Cl. ........................ 523/219; 524/494; 524/603; 524/604; 252/299.01
(58) Field of Search .......................... 523/219; 524/494, 524/603, 604; 252/299.01

(56) References Cited

U.S. PATENT DOCUMENTS

| | | | | | |
|---|---|---|---|---|---|
| 5,348,990 A | * | 9/1994 | Walpita et al. | ............... | 523/219 |
| 5,378,533 A | * | 1/1995 | Ota | ............................ | 252/512 |
| 5,882,741 A | * | 3/1999 | Rubin et al. | ........... | 252/299.01 |

FOREIGN PATENT DOCUMENTS

| | | |
|---|---|---|
| JP | 58-93759 | 6/1983 |
| JP | 64-74258 | 3/1989 |

* cited by examiner

Primary Examiner—Tae H. Yoon
(74) Attorney, Agent, or Firm—Birch, Stewart, Kolasch & Birch, LLP

(57) ABSTRACT

Provided is a liquid crystal polyester resin composition comprising 100 parts by weight of a liquid crystal polyester resin, 2 to 50 parts by weight of hollow sphere having an average particle diameter of 5 to 500 $\mu$m and a volume hollowness of 60 to 80%, and 0 to 40 parts by weight of inorganic fiber, wherein said liquid crystal polyester resin composition has the specific range of fracture rate of the hollow sphere. The liquid crystal polyester resing composition gives a molded product having necessary mechanical physical properties, light-weighted and excellently low thermal conductivity, with good reproducibility.

10 Claims, No Drawings

LIQUID CRYSTAL POLYESTER RESIN COMPOSITION AND MOLDED PRODUCT THEREOF

BACKGROUND OF THE INVENTION

1. Field of the Invention

The present invention relates to a liquid crystal polyester resin composition and a molded product thereof. More precisely, it relates to a liquid crystal polyester resin composition containing hollow sphere and a molded product thereof.

2. Description of the Related Art

Because of their excellent thermal resistance and mechanical physical properties as well as their excellent flowability in molten state, i.e. processability, melt liquid crystallinity polyester reins that exhibit liquid crystallinity in molten state (hereinafter, such resin is referred to as liquid crystal polyester resin) have been used in various field including electric and electronic fields as molding materials which can be subjected to precise molding. In recent years, in the electric and electronic fields, downsizing, lightening and performance-elevating are more and more required. Following this, more light-weighted resins have been required for liquid crystal polyester resins as the materials having necessary heat resistance, mechanical physical properties and processability.

As means for lightening liquid crystal polyester resins, a method of compounding hollow sphere has been known. For example, JP-A-58-93759 (JP-B-64-7626) and JP-A-64-74258 describe light-weighted and excellently isotropic resin compositions as well as molding products thereof.

In the conventional resin compositions containing hollow sphere and molded products, however, insufficient reproducibility was inevitable in production thereof, including instability in performance occurred by ununiformity in degree of fracture of hollow spheres, and thus they were not satisfactory for production in the industrial scale.

SUMMARY OF THE INVENTION

An object of the invention is to provide, with good reproducibility, a liquid crystal polyester resin composition, which gives a molded product having necessary mechanical physical properties, light-weighted and excellently low thermal conductivity, and to provide a molded product thereof.

As the result of intensive studies, the present inventors have found that the above object can be attained by a specific liquid crystal polyester resin composition containing a specific amount of specific hollow spheres, and thus completed the present invention.

Accordingly, the present invention relates to (1) a liquid crystal polyester resin composition comprising 100 parts by weight of a liquid crystal polyester resin, 2 to 50 parts by weight of hollow sphere having an average particle diameter of 5 to 500 $\mu$m and a volume hollowness of 60 to 80%, and 0 to 40 parts by weight of inorganic fiber, wherein said liquid crystal polyester resin composition having an X value, defined below, of 10 to 50:

$$X=100\times[(100/\rho_0+\alpha/\rho_1+\beta/\rho_3)-(100+\alpha+\beta)/\rho]/(\alpha/\rho_1-\alpha/\rho_2)$$

in the formula, a represents the amount of the hollow sphere (part by weight based on 100 parts by weight of the liquid crystal polyester resin), $\beta$ represents the amount of the inorganic fiber (part by weight based on 100 parts by weight of the liquid crystal polyester resin), $\rho_0$ represents the specific gravity of the liquid crystal polyester resin, $\rho_1$ represents the true specific gravity of the hollow sphere, $\rho_2$ represents the material specific gravity of the hollow sphere, $\rho_3$ represents the specific gravity of the inorganic fiber and $\rho$ represents the specific gravity of ASTM No. 4 dumbbell (having a thickness of 2.5 mm) obtained by injection molding of said liquid crystal polyester resin composition.

Said liquid crystal polyester resin composition can be obtained by compounding 2 to 50 parts by weight of hollow sphere having an average particle diameter of 5 to 500 $\mu$m and a volume hollowness of 60 to 80%, and 0 to 40 parts by weight of inorganic fiber with 100 parts by weight of a liquid crystal polyester resin.

The present invention also relates to (2) a molded product obtained by molding the liquid crystal polyester resin composition according to the above described (1).

The present invention further relates to a molded product obtainable by molding a liquid crystal polyester resin compound comprising 100 parts by weight of a liquid crystal polyester resin, 2 to 50 parts by weight of hollow sphere having an average particle diameter of 5 to 500 $\mu$m and a volume hollowness of 60 to 80%, and 0 to 40 parts by weight of inorganic fiber, wherein said molded product having an X' value, defined below, of 10 to 50:

$$X'=100\times[(100/\rho_0+\alpha/\rho_1+\beta/\rho_3)-(100+\alpha+\beta)/\rho]/(\alpha/\rho_1-\alpha/\rho_2)$$

in the formula, a represents the amount of the hollow sphere (part by weight based on 100 parts by weight of the liquid crystal polyester resin), $\beta$ represents the amount of the inorganic fiber (part by weight based on 100 parts by weight of the liquid crystal polyester resin), $\rho_0$ represents the specific gravity of the liquid crystal polyester resin, $\rho_1$ represents the true specific gravity of the hollow sphere, $\rho_2$ represents the material specific gravity of the hollow sphere, $\rho_3$ represents the specific gravity of the inorganic fiber and $\rho'$ represents the specific gravity of said molded product.

DETAILED DESCRIPTION OF THE INVENTION

The liquid crystal polyester resin used in the invention is a polyester generally called thermotropic liquid crystal polymer, and forms an isotropic melt at a temperature of 400° C. or below. Examples include:

a resin comprising a combination of an aromatic dicarboxylic acid, an aromatic diol and an aromatic hydroxycarboxylic acid;

a resin comprising different aromatic hydroxycarboxylic acids;

a resin comprising a combination of an aromatic dicarboxylic acid and an aromatic diol;

a resin formed by reacting a polyester such as polyethylene terephthalate or the like with an aromatic hydroxycarboxylic acid; and the like. As materials for synthesis, sometimes ester-forming derivatives thereof are used in place of these aromatic dicarboxylic acid, aromatic diol and aromatic hydroxycarboxylic acid.

The structural unit of the liquid crystal polyester used in the present invention include the followings.

Structural units derived from aromatic hydroxycarboxylic acids:

(A₁)
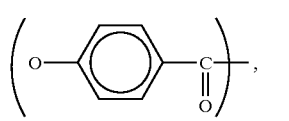
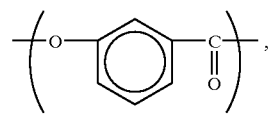
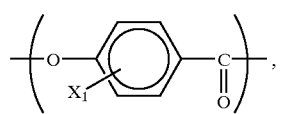
(X₁: halogen, alkyl)
(A₂)
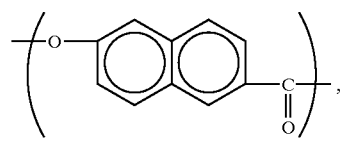
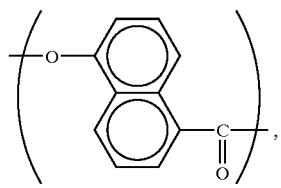
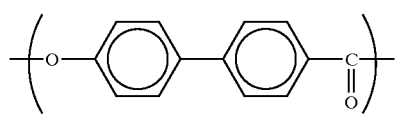
Structural units derived from aromatic dicarboxylic acids:
(B₁)
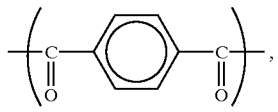
(B₂)
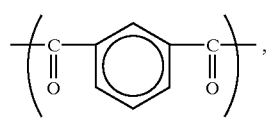
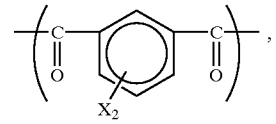
(X₂: halogen, alkyl, aryl)
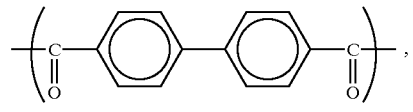
(B₃)
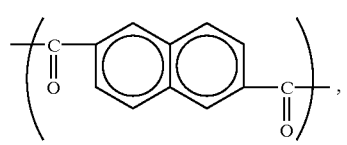
-continued
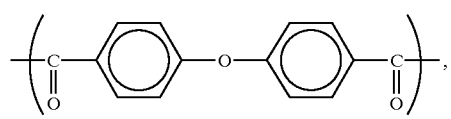
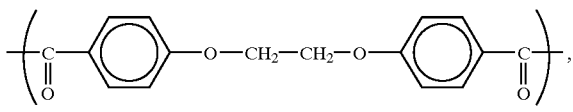
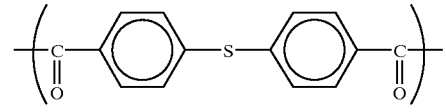
Structural units derived from aromatic diols:
(C₁)
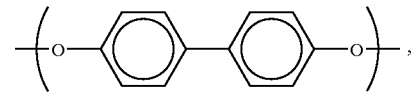
(C₂)
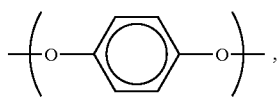
(C₃)
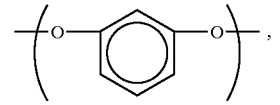
(X₂: halogen, alkyl or aryl)
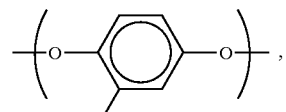
(X₃: H, halogen, or alkyl)
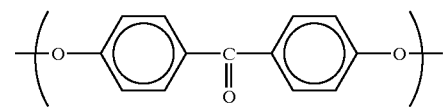
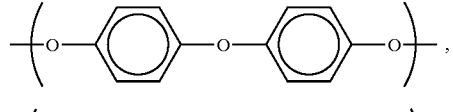
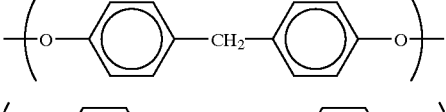
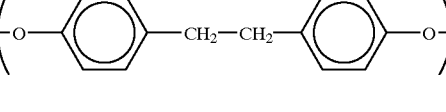

-continued

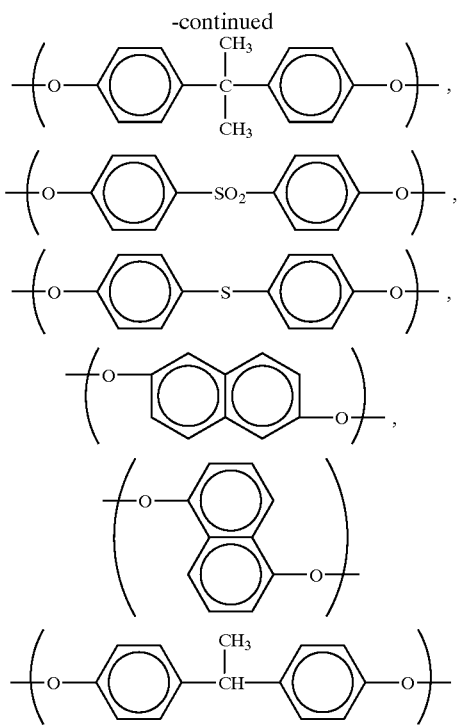

The liquid crystal polyester which is preferable from the standpoint of balance between heat-resistance, mechanical property and processability is a liquid crystal polyester resin containing the structural unit represented by ($A_1$) in an amount of at least 30 mol %. Specifically, those structural units having following combinations are preferable.

Combination of ($A_1$), ($B_1$), ($B_2$), and ($C_1$).
Combination of ($A_1$), ($B_1$), ($B_2$), and ($C_2$).
Combination of ($A_1$), ($B_1$), ($B_2$), ($C_1$) and ($C_2$).

Known methods can be adopted for preparing liquid crystal polyester resins used in the present invention. For example, liquid crystal polyester resins of (a) and (b) are described in Japanese Patent Kokoku Publication (JP-B) Nos. 47-47870, 63-3888, and the like.

The hollow sphere used in the invention is generally called balloon. Examples of materials for the hollow sphere include inorganic materials such as alumina, silica, glass and the like; and organic materials such as urea resins, phenol resins and the like. A mixture of two or more thereof may be used as required. Amongst them, glass is suitable from the viewpoint of thermal resistance and strength. Therefore, glass balloon is preferably used as the hollow sphere.

The average particle diameter of the hollow sphere used in the invention is 5 µm or more, preferably 10 µm or more, from the viewpoint of molding characteristics and mechanical strength. The average particle diameter is 500 µm or less, preferably 200 µm or less, from the viewpoint of fracture inhibition and molding characteristics of the hollow sphere. The volume hollowness of the hollow sphere is 60% or more from the viewpoint of lowering of specific gravity, and 80% or less from the viewpoint of fracture inhibition of the hollow sphere. The volume hollowness of the hollow sphere can be obtained according to the following equation: Volume hollowness (%)=100×(1−$\rho_1/\rho_2$) wherein $\rho_1$ represents the true specific gravity of the hollow sphere (i.e., the specific gravity of the hollow sphere as it is), $\rho_2$ represents the material specific gravity of the hollow sphere (i.e., the specific gravity of the material itself that constitutes the hollow sphere).

The amount of the hollow sphere to be contained is 2 parts by weight or more, preferably 5 parts by weight or more, based on 100 parts by weight of the liquid crystal polyester resin, and 50 parts by weight or less, preferably 30 parts by weight or less, from the viewpoint of a balance of the specific gravity or stiffness.

The liquid crystal polyester resin composition of the invention may contain inorganic fiber for the purpose of increasing the strength. Examples of the inorganic fiber include glass fiber, alumina fiber, carbon fiber, boron fiber, potassium titanate fiber, asbestos and the like. Two or more of them can be used as required. Amongst them, glass fiber is suitably used.

When the inorganic fiber is contained, the amount thereof to be contained is usually 1 part by weight or more, preferably 3 parts by weight or more, more preferably 5 parts by weight or more, and usually 40 parts by weight or less, preferably 15 parts by weight or less, from the viewpoint of flowability, based on 100 parts by weight of the liquid crystal polyester resin. Sum of respective amounts of the hollow sphere and the inorganic fiber is usually 50 parts by weight or less, preferably 30 parts by weight or less, based on 100 parts by weight of the liquid crystal polyester resin.

The liquid crystal polyester resin composition of the invention has an X value, defined below, of 10 to 50:

$$X=100\times[(100/\rho_0+\alpha/\rho_1+\beta/\rho_3)-(100+\alpha+\beta)/\rho](\alpha/\rho_1-\alpha/\rho_2)$$

wherein α represents the amount of the hollow sphere (part by weight based on 100 parts by weight of the liquid crystal polyester resin), β represents the amount of the inorganic fiber (part by weight based on 100 parts by weight of the liquid crystal polyester resin), $\rho_0$ represents the specific gravity of the liquid crystal polyester resin, $\rho_1$ represents the true specific gravity of the hollow sphere, $\rho_2$ represents the material specific gravity of the hollow sphere, $\rho_3$ represents the specific gravity of the inorganic fiber and ρ represents the specific gravity of ASTM No. 4 dumbbell (having a thickness of 2.5 mm) obtained by injection molding of said liquid crystal polyester resin composition.

In the injection molding of the ASTM No. 4 dumbbell (having a thickness of 2.5 mm), the following conditions can be adopted:

Cylinder temperature: flow beginning temperature +20° C.

(The flow beginning temperature means a temperature at which the melt viscosity shows 4800 Pa·s when a heated melt is extruded under a load of 100 kg/cm² (9.81 MPa·s) and a heating rate of 4° C./minute using a capillary rheometer with a nozzle having an inside diameter of 1 mm and a length of 10 mm.)

Mold temperature: 130° C.

The above value X corresponds to the fracture rate of the hollow sphere, because, in the above formula, (100/$\rho_0$+α/$\rho_1$+β/$\rho_3$) corresponds to sum of volumes of the liquid crystal polyester resin, plus hollow sphere and inorganic fiber before compounding, (100+α+β)/ρ corresponds to a volume of ASTM No. 4 dumbbell (having a thickness of 2.5 mm), and (α/$\rho_1$−α/$\rho_2$) corresponds to a volume of hollow space of the hollow sphere before compounding, when the weight of the liquid crystal polyester resin is taken as 100.

The value X is preferably 30 or less and more preferably 20 or less. The value X of less than 10 is not preferred from the viewpoint of reproducibility on production and strength, and the value exceeding 50 is not preferred from the viewpoint of light-weighting and low thermal conductivity.

Preparation of the liquid crystal polyester resin composition of the invention may be carried out by mixing respective components including the liquid crystal polyester resin, hollow sphere, inorganic fiber as required and others with a Henschel mixer, tumbler or the like; by melt-kneading the respective components with an extruder to give pellets of composition; or by mixing respective components with a Henschel mixer, tumbler or the like and then melt-kneading with an extruder to give pellets of composition.

The liquid crystal polyester resin composition of the invention gives a molded product which is light-weighted and which has an excellent low thermal conductivity. Various molded products can be obtained by molding processes such as injection molding and the like using the composition. Injection molding is preferably conducted under conditions including an injection pressure and a holding pressure of 150 MPa·s in the molding machine, from the viewpoint of fracture inhibition of the hollow sphere.

By molding the liquid crystal polyester resin composition of the invention, amolded product can be obtained having an X' value, defined below, of 10 to 50:

$$X'=100\times[(100/\rho_0+\alpha/\rho_1+\beta/\rho_3)-(100+\alpha+\beta)/\rho']/(\alpha/\rho_1-\alpha/\rho_2)$$

wherein a represents the amount of the hollow sphere (part by weight based on 100 parts by weight of the liquid crystal polyester resin), β represents the amount of the inorganic fiber (part by weight based on 100 parts by weight of the liquid crystal polyester resin), $\rho_0$ represents the specific gravity of the liquid crystal polyester resin, $\rho_1$ represents the true specific gravity of the hollow sphere, $\rho_2$ represents the material specific gravity of the hollow sphere, $\rho_3$ represents the specific gravity of the inorganic fiber and ρ' represents the specific gravity of said molded product.

The value X' is preferably 30 or less and more preferably 20 or less. The value X' of less than 10 is not preferred from the viewpoint of reproducibility on production and strength, and the value exceeding 50 is not preferred from the viewpoint of light-weighting and low thermal conductivity. The value X' corresponds to the fracture rate of the hollow sphere like the value X described above.

Examples of the molded product include: electric and electronic parts such as connector, socket, relay parts, coil bobbin, optical pickup, oscillator element, computer-related parts and the like; parts related to process for producing semiconductor such as IC tray and the like; domestic electric appliance parts such as VTR, television, iron, air conditioner, stereo, cleaner, refrigerator, rice cooker, illumination instruments and the like; parts for acoustic goods such as compact disk, laser disk, speaker and the like; parts for communication apparatuses such as telephone, facsimile, modem and the like; parts related to copiers and printers such as heater-holder and the like; machine parts such as impeller, fan-gear, gear, bearing, motor parts and casing and the like; cooking appliances such as microwave cooking pan, heat-resistant dish and the like; building materials or construction materials such as heat-insulation and sound-insulation materials including flooring material and wall material, supporting materials including pillar and beam, roof materials and the like; parts for aircrafts; parts for space machinery; parts for radiation facility such as nuclear reactor and the like, parts for marine facility, jigs for cleaning, pipes, nozzles, parts for sensors, sports goods, leisure goods and so on.

EXAMPLES

The present invention will now be described in reference to Examples, which should not be construed as a limitation upon the scope of the invention.

Examples 1 to 4 and Comparative Examples 1 to 5

The following components were granulated according to the compositions shown in Table 1 using a twin-screw extruder (PMT 47 manufactured by IKG Corp) at a cylinder temperature of 400° C. to give pellets of liquid crystal polyester resin compositions.

Liquid crystal polyester resin: a liquid crystal polyester resin [specific gravity: 1.38] composed of the structural units ($A_1$), ($B_1$), ($B_2$) and ($C_1$) described above in a molar ratio of ($A_1$):($B_1$):($B_2$):($C_1$)=50:23.75:1.25 25 and having a flow beginning temperature of 380° C.

Glass balloon 1: glass balloon having an average particle diameter of 30 μm and a volume hollowness of 76% [commercial name: Scotch Light S 60, manufactured by Sumitomo 3M Limited, having a true specific gravity of 0.60 and a material specific gravity of 2.50].

Glass balloon 2: glass balloon having an average particle diameter of 40 μm and a volume hollowness of 70% [commercial name: CEL-STAR PZ-6000, manufactured by Tokai Kogyo Co. Ltd., having a true specific gravity of 0.75 and a material specific gravity of 2.50].

Glass balloon 3: glass balloon having an average particle diameter of 40 μm and a volume hollowness of 85% [commercial name: Scotchlight S 38, manufactured by Sumitomo 3M Limited, having a true specific gravity of 0.38 and a material specific gravity of 2.50].

Glass balloon 4: glass balloon having an average particle diameter of 10 μm and a volume hollowness of 56% [commercial name: HSC 110, manufactured by Toshiba-Ballotini Ltd., having a true specific gravity of 1.10 and a material specific gravity of 2.50].

Shirasu balloon 5: shirasu balloon having an average particle diameter of 30 μm and a volume hollowness of 56% [commercial name: SYB-1000SS, manufactured by Towana, having a true specific gravity of 1.1 and a material specific gravity of 2.50].

Glass fiber: chopped glass fiber [commercial name: CS03JAPX-1, manufactured by Asahi Fiber Glass Company Limited, having a true specific gravity of 2.54].

In the above described twin-screw extruder, full flighted screws were used as the screws and feed two zones were placed at the uppermost stream portion and a down stream portion (the distance between the uppermost stream portion and the down stream portion=diameter of the full flighted screw×14). In Examples 1, 2, 3 and 4 and Comparative Examples 1, 2 and 4, a liquid crystal polyester resin and glass fibers were fed from the uppermost portion and balloons were fed from the down stream portion. In Example 2, the granulating temperature was 390° C. In Example 5, a liquid crystal polyester resin was fed from the uppermost stream portion and balloons and glass fibers were fed from the down stream portion. In Comparative Example 3, a liquid crystal polyester resin, balloons and glass fibers were fed from the down stream portion.

The obtained pellets were subjected to injection molding at a cylinder temperature of 400° C. and a mold temperature of 130° C. using a injection molding machine PS40E5ASE, manufactured by Nissei Plastic Industrial Co., Ltd. , to give test pieces, shown below, f or which measurements described below were conducted. The results are shown in Table 1.

Specific gravity: ASTM No. 4 dumbbell was subjected to the measurement according to ASTM D792 (230). When a test piece of a size 64×64×15 mm (thickness) or a test piece of 127 mm in length, 12.7 mm in width and 6.4 mm in thickn were used in place of the No. 4 dumbbell, similar results were obtained.

Thermal conductivity: A test piece of a size 64×64×15 mm (thickness) was subjected to the measurement according to JIS R2618.

Flexural strength: A test piece of 127 mm in length, 12.7 mm in width and 6.4 mm in thickness was subjected to the measurement according to ASTM D790.

Surface property: The surface of a molded product obtained by molding a No. 4 dumbbell according to ASTM was visually observed [○, good; X, bad (with blister on molding)].

For the above described Examples, similar results were obtained with good reproducibility.

TABLE 1

|  | Example | | | | | Comparative example | | | | |
| --- | --- | --- | --- | --- | --- | --- | --- | --- | --- | --- |
|  | 1 | 2 | 3 | 4 | 5 | 1 | 2 | 3 | 4 | 5 |
| Composition | | | | | | | | | | |
| Liquid crystal polyester resin | 100 | 100 | 100 | 100 | 100 | 100 | 100 | 100 | 100 | 100 |
| Glass balloon 1 | 11.8 | 18.8 | 18.8 | — | 18.8 | — | — | — | — | — |
| Glass balloon 2 | — | — | — | 18.8 | — | — | — | 18.8 | — | — |
| Glass balloon 3 | — | — | — | — | — | 11.8 | — | — | — | — |
| Glass balloon 4 | — | — | — | — | — | — | 18.8 | — | — | — |
| Shirasu balloon 1 | — | — | — | — | — | — | — | — | 18.8 | — |
| Glass fiber | 5.9 | 6.3 | 6.3 | 6.3 | 6.3 | 5.9 | 6.3 | 6.3 | 6.3 | — |
| Evaluation of physical property | | | | | | | | | | |
| X | 30.8 | 32.6 | 12.1 | 29.9 | 22.6 | 75.7 | 34.6 | 57.2 | 84.4 | — |
| Specific gravity | 1.31 | 1.27 | 1.21 | 1.32 | 1.24 | 1.37 | 1.41 | 1.35 | 1.49 | 1.38 |
| Thermal conductivity (W/mk) | 0.42 | 0.41 | 0.39 | 0.41 | 0.41 | 0.41 | 0.44 | 0.45 | 0.44 | 0.40 |
| Flexural strength (MPa) | 118 | 107 | 89 | 97 | 103 | 120 | 120 | 115 | 97 | 128 |
| Surface property | ○ | ○ | ○ | ○ | ○ | ○ | ○ | ○ | X | ○ |

The liquid crystal polyester resin composition of the invention can be produced with good reproducibility, and the molded product obtainable therefrom is light-weighted, excellent in lower thermal conductivity and thus useful as a material for electric and electronic parts or the like.

What is claimed is:

1. A liquid crystal polyester resin composition comprising 100 parts by weight of a liquid crystal polyester resin, 2 to 50 parts by weight of hollow sphere having an average particle diameter of 5 to 500 μm and a volume hollowness of 60 to 80%, and 1 to 40 parts by weight of inorganic fiber, wherein said liquid crystal polyester resin composition has an X value, defined below, of 10 to 50:

X=100×[(100/ρ₀+α/ρ₁+β/ρ₃)−(100+α+β)/ρ]/(α/ρ₁−α/ρ₂)

in the formula α represents the amount of the hollow sphere (part by weight based on 100 parts by weight of the liquid crystal polyester resin), β represents the amount of the inorganic fiber (part by weight based on 100 parts by weight of the liquid crystal polyester resin), ρ₀ represents the specific gravity of the liquid crystal polyester resin, ρ₁ represents the true specific gravity of the hollow sphere, ρ₂ represents the material specific gravity of the hollow sphere, ρ₃ represents the specific gravity of the inorganic fiber and ρ represents the specific gravity of ASTM No. 4 dumbbell (having a thickness of 2.5 mm) obtained by injection molding of said liquid crystal polyester resin composition.

2. The liquid crystal polyester resin composition according to claim 1, wherein the liquid crystal polyester resin has 30% by mole or more of the following structural unit (A₁):

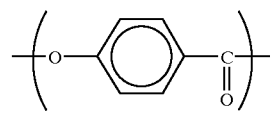

(A₁)

3. The liquid crystal polyester resin composition according to claim 1, wherein the hollow sphere is glass balloon.

4. The liquid crystal polyester resin composition according to claim 1, wherein the inorganic fiber is glass fiber.

5. A liquid crystal polyester resin composition according to claim 1, wherein said liquid crystal polyester resin composition is obtained by compounding 2 to 50 parts by weight of hollow sphere having an average particle diameter of 5 to 500 μm and a volume hollowness of 60 to 80%, and 1 to 40 parts by weight of inorganic fiber with 100 parts by weight of a liquid crystal polyester resin.

6. A molded product obtained by molding the liquid crystal polyester resin composition according to any of claims 1 to 5.

7. A molded product obtained by molding a liquid crystal polyester resin compound comprising 100 parts by weight of a liquid crystal polyester resin, 2 to 50 parts by weight of hollow sphere having an average particle diameter of 5 to 500 μm and a volume hollowness of 60 to 80%, and 1 to 40 parts by weight of inorganic fiber, wherein said molded product has an X' value, defined below, of 10 to 50:

$$X=100\times[(100/\rho_0+\alpha/\rho_1+\beta/\rho_3)-(100+\alpha+\beta)/\rho']/(\alpha/\rho_1-\alpha/\rho_2)$$

in the formula $\alpha$ represents the amount of the hollow sphere (part by weight based on 100 parts by weight of the liquid crystal polyester resin), $\beta$ represents the amount of the inorganic fiber (part by weight based on 100 parts by weight of the liquid crystal polyester resin), $\rho_0$ represents the specific gravity of the liquid crystal polyester resin, $\rho_0$, represents the true specific gravity of the hollow sphere, $\rho_2$ represents the material specific gravity of the hollow sphere, $\rho_3$ represents the specific gravity of the inorganic fiber and $\rho_1$ represents the specific gravity of said molded product.

8. The molded product according to claim 7, wherein the liquid crystal polyester resin has 30% by mole or more of the following structural unit ($A_1$):

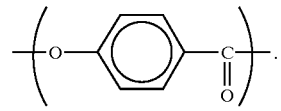

(A₁)

9. The molded product according to claim 7, wherein the hollow sphere is glass balloon.

10. The molded product according to claim 7, wherein the inorganic fiber is glass fiber.

* * * * *